(12) United States Patent
Rodoni

(10) Patent No.: US 10,120,389 B2
(45) Date of Patent: Nov. 6, 2018

(54) SYSTEMS AND METHODS FOR AUTONOMOUS RECEPTACLE TRANSPORTATION

(71) Applicant: Rubicon Global Holdings, LLC, Atlanta, GA (US)

(72) Inventor: Philip Rodoni, Decatur, GA (US)

(73) Assignee: RUBICON GLOBAL HOLDINGS, LLC, Atlanta, GA (US)

( * ) Notice: Subject to any disclaimer, the term of this patent is extended or adjusted under 35 U.S.C. 154(b) by 0 days.

(21) Appl. No.: 15/818,688

(22) Filed: Nov. 20, 2017

(65) Prior Publication Data

US 2018/0074512 A1    Mar. 15, 2018

Related U.S. Application Data

(63) Continuation of application No. 15/241,485, filed on Aug. 19, 2016, now Pat. No. 9,829,892.

(51) Int. Cl.
*G05D 1/02* (2006.01)
*B65F 1/14* (2006.01)
*B65F 3/02* (2006.01)

(52) U.S. Cl.
CPC ......... *G05D 1/0291* (2013.01); *B65F 1/1473* (2013.01); *B65F 3/02* (2013.01); *B65F 2210/128* (2013.01); *B65F 2210/138* (2013.01); *B65F 2210/165* (2013.01); *G05D 2201/02* (2013.01)

(58) Field of Classification Search
CPC ............. G05D 1/0291; G05D 2201/02; B65F 1/1473; B65F 3/02; B65F 2210/165
USPC ........................................................ 701/23
See application file for complete search history.

(56) References Cited

U.S. PATENT DOCUMENTS

| | | | |
|---|---|---|---|
| 8,989,972 B2* | 3/2015 | Anderson | A61B 5/6804 |
| | | | 701/301 |
| 2017/0174427 A1* | 6/2017 | Wagner | B65F 1/1452 |

OTHER PUBLICATIONS

Bergagard Patrik "Controlling an autonomous refuse handling system" Mar. 9, 2016. IFACBLOG: http://blog.ifac-control.org/2016/03/09/controlling-an-autonomous-refuse-handling-system/. hereinafter referred to as Bergagard.*

Charlmers University of Technology, "The Student project ROAR—Robot-based Autonomous Refuse handling—Animation": (videohttps://vimeo.com/156620788) Feb. 24 2016, hereinafter referred to as ROAR.*

* cited by examiner

*Primary Examiner* — Yazan A Soofi
(74) *Attorney, Agent, or Firm* — Rock IP, PLLC

(57) ABSTRACT

A system is disclosed for autonomously removing waste from a plurality of receptacles at separate locations within a service area. The system may include a service vehicle, and a plurality of transporters. The plurality of transporters may be configured to autonomously move the plurality of receptacles to the service vehicle.

20 Claims, 4 Drawing Sheets

SYSTEMS AND METHODS FOR AUTONOMOUS RECEPTACLE TRANSPORTATION

CROSS-REFERENCED APPLICATIONS

The present application is a continuation of U.S. patent application Ser. No. 15/241,485 filed on Aug. 19, 2016, which is incorporated by reference in its entirety.

TECHNICAL FIELD

The present disclosure relates generally to a system, method, and vehicle for autonomously removing waste from separate locations.

BACKGROUND

Residential waste service providers typically dispatch service vehicles to customer properties according to a predetermined pickup schedule assigned to each vehicle. For example, a particular service vehicle may be dispatched to the same neighborhood every Monday to retrieve waste from every subscribing customer in the neighborhood. After the service vehicle enters the neighborhood, the service vehicle may travel to each separate customer, where any waste receptacles that were previously set out by the customer are emptied into the vehicle. After the waste receptacles are emptied at each customer property, the customer is responsible for returning the waste receptacles to their original collection locations on the property. When all customer properties within the neighborhood have been serviced, the vehicle may move to another neighborhood to repeat a similar process.

Although the process described above may be acceptable for some situations, it can also be problematic. For example, if the customer fails to set out their waste receptacles or sets them out on the wrong day or at the wrong time, service at that customer's property may not be possible. As a result, the customer may miss the service opportunity. Similarly, the customer may delay returning the emptied waste receptacles to their original collection locations, resulting in the receptacles being set out for prolonged periods of time. In addition, setting out and returning the waste receptacles can be a hassle for the customer. Likewise, it can be inefficient and costly for the service vehicle to travel to and stop at each customer property.

The disclosed method, system, and vehicle are directed to overcoming one or more of the problems set forth above and/or other problems of the prior art.

SUMMARY

In one aspect, the present disclosure is directed to a system for autonomously removing waste from a plurality of receptacles at separate locations within a service area. The system may include a service vehicle, and a plurality of transporters. The plurality of transporters may be configured to autonomously move the plurality of receptacles to the service vehicle.

In another aspect, the present disclosure is directed to a method of autonomously removing waste from a plurality of receptacles. The method may include dispatching a service vehicle to a service area, and autonomously transporting the plurality of receptacles from separate locations to the service vehicle at the service area. The method may also include emptying the plurality of receptacles into the service vehicle, and autonomously returning the plurality of receptacles to the separate locations.

In yet another aspect, the present disclosure is directed to a service vehicle. The service vehicle may include a rolling chassis, and a bed supported by the rolling chassis and configured to receive waste. The service vehicle may further include a controller in communication with the rolling chassis and configured to autonomously operate the service vehicle, and a plurality of transporters carried by the rolling chassis. The plurality of transporters may be selectively dispatched from the service vehicle by the controller to retrieve receptacles from separate locations in a service area of the service vehicle for emptying into the bed of the service vehicle.

DETAILED DESCRIPTION

Figure 1:
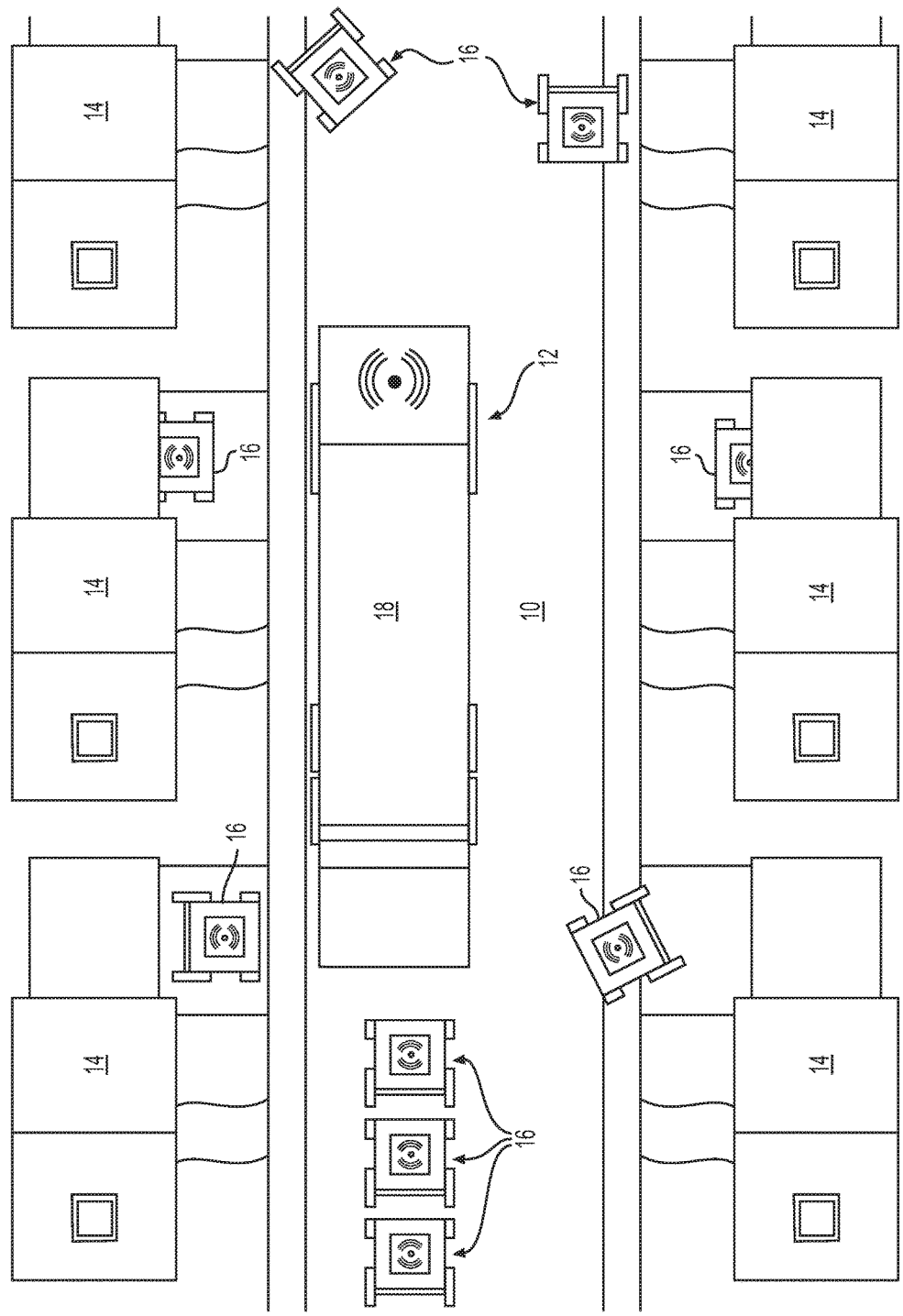
FIG. 1 is a plan view illustration of an exemplary disclosed waste removal system.

FIG. 1 illustrates an exemplary service area 10, at which an exemplary service vehicle 12 has been dispatched to provide waste removal services. Service area 10 may include a shopping plaza, a business park, a residential neighborhood, or another area having separate locations 14 requiring the services of vehicle 12. One or more waste receptacles 16 may be placed at each of locations 14 and, as will be described in more detail below, periodically emptied into service vehicle 12.

Figure 2:
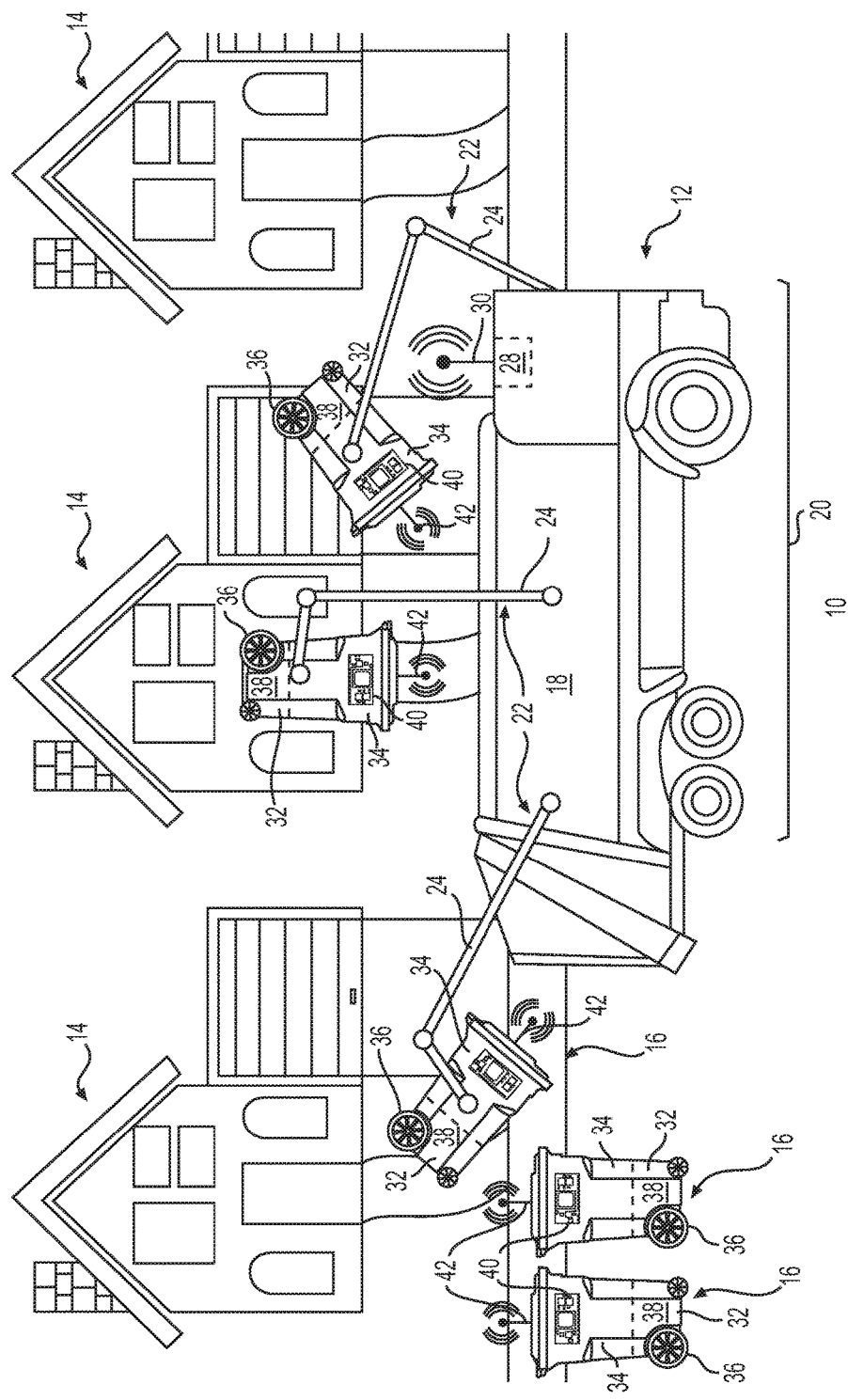
FIG. 2 is a perspective view illustration of the system of FIG. 1.

Service vehicle 12 may take many different forms. For example, service vehicle 12 is illustrated in FIG. 2 as a hydraulically actuated, front- and/or rear-loading type of vehicle. Specifically, service vehicle 12 may include a bed 18 supported by a rolling chassis 20 (e.g., a frame, wheels, an engine, a transmission, driveshafts, suspension, steering linkages, etc.), and a lifting device 22 extending from bed 18 and/or rolling chassis 20. Lifting device 22 may consist of, among other things, one or more lift arms 24 configured to engage and/or grasp receptacle 16, and one or more actuators (not shown) powered, for example by pressurized oil, to raise and tilt lift arms 24 (and receptacle 16) to a dump location inside of bed 18. After dumping of receptacle 16, lift arms 24 may lower receptacle 16 back to the ground near service vehicle 12 and release hold of receptacle 16.

In another example, lifting device 22 may be located to pick up receptacles 16 from a side of service vehicle 12. In yet another example, receptacles 16 may be lifted and dumped into bed 18 without the use of a vehicle-mounted lifting device. In any of these examples, bed 18 could be outfitted with a compactor (not shown) to compact the waste material after the material is dumped into bed 18, and/or a door (not shown) configured to close an opening of bed 18 through which the waste material is dumped. Other configurations may also be possible.

In the embodiment shown in FIGS. 1 and 2, vehicle 12 is at least semi-autonomous. For example, vehicle 12 may be autonomously and/or remotely driven to service area 10 by way of an onboard controller 28. Controller 28 may include computing means for monitoring inputs from other components of vehicle 12 and for generating corresponding output signals (e.g., propulsion and steering command signals directed to rolling chassis 20) based on the inputs. In some embodiments, controller 28 may include a memory, a secondary storage device (not shown), a clock (not shown), a single or multiple microprocessors, and one or more control modules for autonomously controller service vehicle 12. Numerous commercially available microprocessors can be configured to perform the functions of controller 28. Various other known circuits may be associated with controller 28, including signal-conditioning circuitry, communication circuitry, power circuitry, and other appropriate circuitry. Controller 28 may be further communicatively coupled with an external computer system, instead of or in addition to including the computing means, as desired.

As vehicle 12 nears and/or reaches service area 10, controller 28 may be further configured to broadcast (e.g., vie a wireless transmitter 30) a remote signal announcing the arrival of vehicle 12 to service area 10. This arrival signal may be received by a plurality of transporters 32, triggering transporters 32 to move receptacles 16 to service vehicle 12 for emptying.

Transmitter 30 may include one or more hardware components configured to send and receive signals (e.g., digital data messages) via one or more wired or wireless communication mechanisms, protocols, or standards for communicating with other entities. For example, transmitter 30 may be configured to communicate via short- or long-range wireless connections, such as Bluetooth, Wi-Fi, radio frequency identification (RFID), cellular, radio, satellite, or other wireless connections. Transmitter 30 may also or alternatively be configured to communicate via wired connections, such as through a telephone, cable, Ethernet, or other communal or dedicated wired connection. In some embodiments, transmitter 30 may be configured to communicate by one or more short-range connections and one or more long-range connections in order to facilitate convenient and/or efficient communications with a plurality of different types of mobile or stationary devices.

In the example of FIGS. 1 and 2, each transporter 32 forms an integral portion of a corresponding waste receptacle 16. Specifically, transporter 32 may be located below a container 34 and configured to support and propel container 34. For example, transporter 32 may include one or more traction devices (e.g., wheels and/or tracks) 36, a power source (e.g., an electric motor and a battery) 38, an onboard processor 40, and a wireless receiver 42. In response to the arrival signal generated by controller 28, broadcast by transmitter 30, and received by receiver 42, processor 40 may be configured to plan a transportation route from a current location of the associated container 34 to service vehicle 12 and to execute the plan (e.g., by selectively commanding power source 38 to drive and/or steer traction devices 36 in a particular manner).

Processor 40, like controller 28, may include means for monitoring, recording, storing, indexing, processing, communicating, and/or controlling other transporter components. These means may include, for example, a memory, one or more data storage devices, a central processing unit, or any other components that may be used to run the disclosed application.

As each waste receptacle 16 reaches service vehicle 12, container 34 may be autonomously emptied. In the embodiment of FIGS. 1 and 2, controller 28 may be responsible for regulating the emptying of receptacles 16. For example, in response to a threshold condition being satisfied (e.g., a signal from processor 40 being received, a proximity of transporter 32 being detected, a switch being tripped, etc.), controller 28 may command the actuator(s) associated with lifting device 22 to grasp, lift, and/or tilt waste receptacle 16 such that the contents thereof are dumped into bed 18. Thereafter, controller 28 may command the actuator(s) associated with lifting device 22 to return waste receptacle 16 to the ground, and then signal processor 40 to autonomously drive waste receptacle 16 back to its original collection position at a corresponding customer's property.

Figure 3:
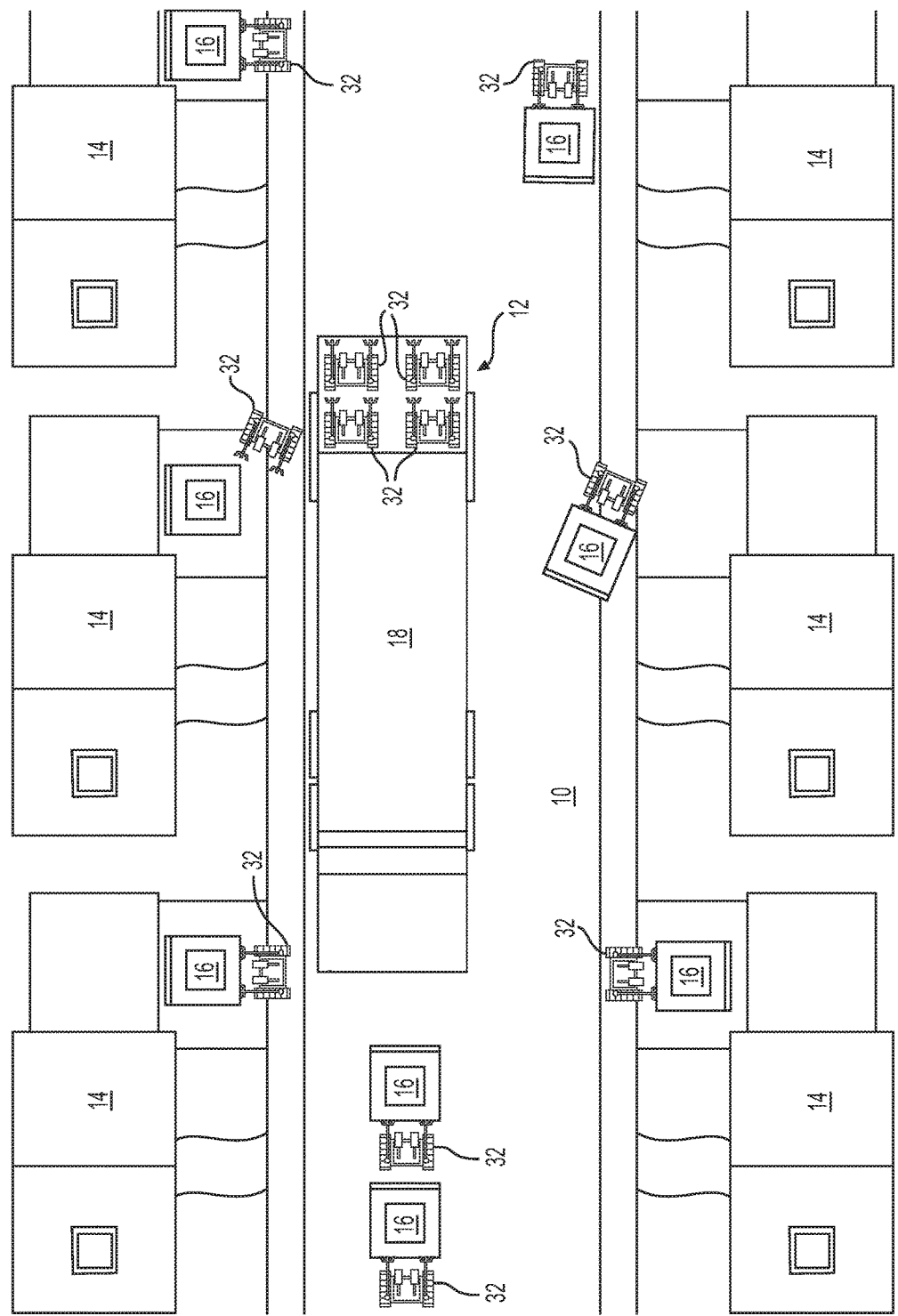
FIG. 3 is a plan view illustration of another exemplary disclosed waste removal system.
Figure 4:
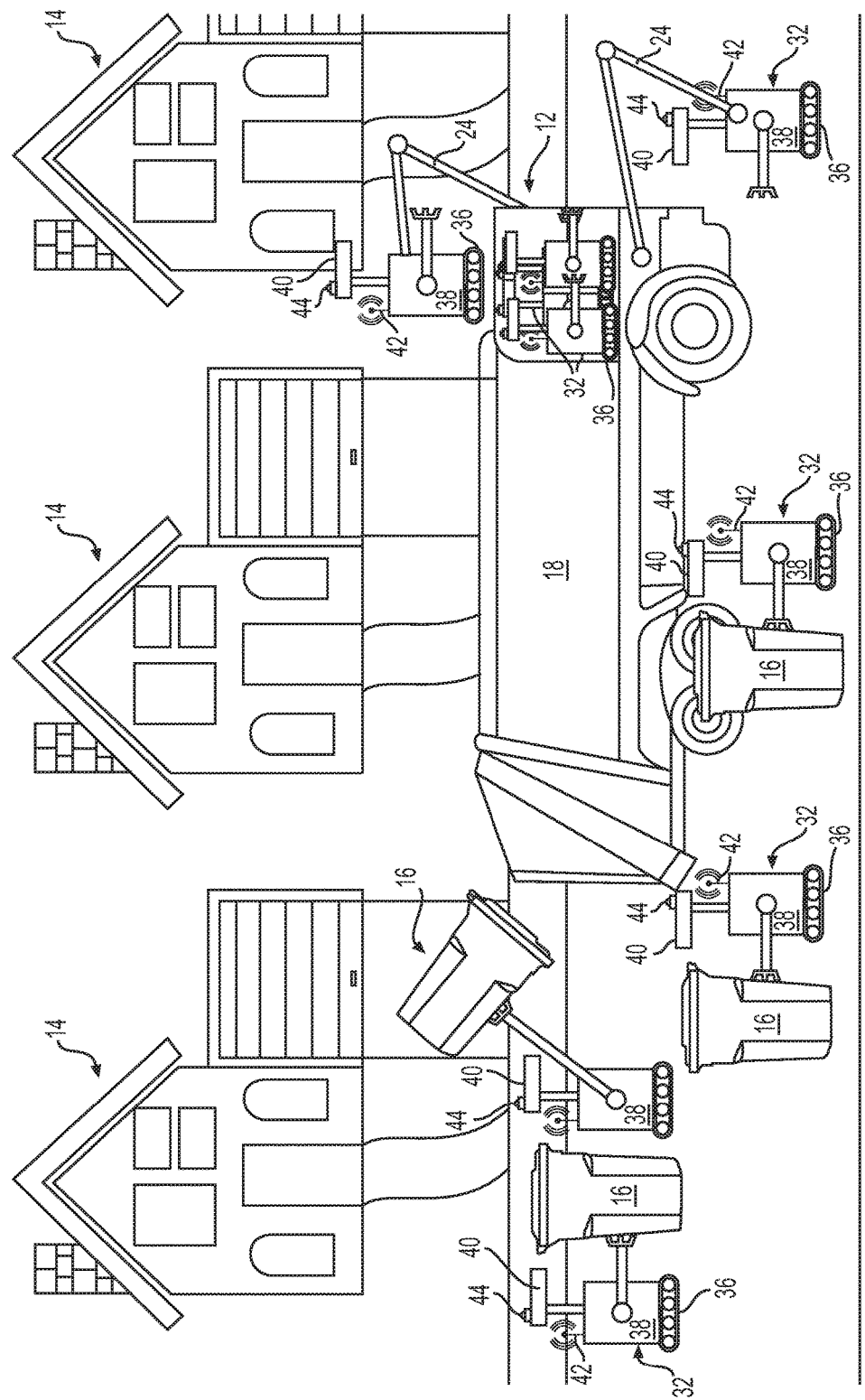
FIG. 4 is a perspective view illustration of the system of FIG. 3.

In an alternative embodiment shown in FIGS. 3 and 4, waste receptacle 16 may be a conventional (e.g., non-mobile and/or non-autonomous) receptacle. In this embodiment, transporter 32 is a separate device that is carried to service area 10 by vehicle 12. In particular, vehicle 12 may be configured to simultaneously carry a plurality of transporters 32. Upon reaching service area 10, instead of broadcasting an arrival signal, controller 28 may instead trigger offloading of transporters 32 (e.g., via lifting device 22 or another similar mechanism). Processor 40 of each transporter 32 may then be assigned to retrieve a particular receptacle 16 (e.g., a receptacle having a particular indicia, barcode, rf tag, etc.) from a particular customer property. In some embodiments, processor 40 may need to rely on information from a locating device 44 (e.g., a GPS device, a RADAR sensor, a LIDAR sensor, or another optical means of navigation—shown only in FIG. 4) in order to navigate to the assigned property and/or a scanner or reader to identify the particular receptacle 16. After retrieving the corresponding receptacle 16 and returning to vehicle 12, processor 40 may then cause transporter 32 to load receptacle 16 into lift arms 24 for subsequent emptying. In one embodiment, transporters 32 may themselves lift and/or tilt receptacles 16 during emptying without the aid of a vehicle-mounted lift device. In another embodiment transporters 32 may merely position receptacles relative to vehicle 12, and then generate a signal indicative of readiness for lift arms 24 to grasp, lift, and tilt receptacles 16 into bed 18.

INDUSTRIAL APPLICABILITY

The disclosed system, method, and vehicle may provide for improved waste services. In particular, the disclosed system may provide for waste removal from separate customer properties without significant customer interaction. For example, the customer may not need to set out and/or retrieve waste receptacles 16, as waste receptacles 16 may be autonomously moved to service vehicle 12, emptied, and returned. In this way, the burden associated with waste removal may be lessened for the customer and the corresponding service may be more likely to be completed in a desired manner. In addition, an efficiency and cost of the waste remove process may be reduced, as vehicle 12 may not need to travel to and stop at each location and because of a reduced amount of human interaction during receptacle collection and dumping.

It will be apparent to those skilled in the art that various modifications and variations can be made to the disclosed method, system, and vehicle. Other embodiments will be apparent to those skilled in the art from consideration of the specification and practice of the disclosed method, system, and vehicle. For example, it is contemplated that the customer may still set out receptacles 16 at a curbside location in anticipation of servicing, even when receptacles 16 may be autonomously moved to vehicle 12. It is intended that the specification and examples be considered as exemplary only, with a true scope being indicated by the following claims and their equivalents.

What is claimed is:

1. A system for autonomous receptacle transportation, comprising:
 a non-transitory memory;
 one or more processors coupled to the non-transitory memory and configured to execute instructions to perform operations comprising:
  monitor location data associated with one or more service vehicles based on first location signals from the one or more service vehicles;
  receive an arrival signal in response to arrival of a first autonomous service vehicle of the one or more service vehicles at a first service area; and
  transmit a message causing one or more receptacles to autonomously navigate to the first autonomous service vehicle, each of the one or more receptacles comprising a transporter that forms an integral portion of the corresponding receptacle.

2. The system of claim 1, wherein a first receptacle of the one or more receptacles includes lift arms and is configured to empty into the first autonomous service vehicle using the lift arms.

3. The system of claim 2, wherein the first receptacle is configured to empty without aid of a vehicle-mounted lift device of the first autonomous service vehicle.

4. The system of claim 1, wherein each of the one or more receptacles is in remote communication with the first autonomous service vehicle in response to arrival of the first autonomous service vehicle.

5. The system of claim 1, wherein the first autonomous service vehicle further comprises:
 a rolling chassis;
 a bed supported by the rolling chassis and configured to receive waste; and
 a controller in communication with the rolling chassis and configured to autonomously operate the first autonomous service vehicle.

6. The system of claim 1, wherein the one or more receptacles are configured to autonomously return to respective receptacle return locations in response to emptying.

7. The system of claim 1, wherein the one or more receptacles each include optical navigation means.

8. A method for autonomous receptacle transportation, comprising:
 monitoring location data associated with one or more service vehicles based on first location signals from the one or more service vehicles;
 receiving an arrival signal in response to arrival of a first autonomous service vehicle of the one or more service vehicles at a first service area; and
 transmitting a message causing one or more receptacles to autonomously navigate to the first autonomous service vehicle, each of the one or more receptacles comprising a transporter that forms an integral portion of the corresponding receptacle.

9. The method of claim 8, wherein a first receptacle of the one or more receptacles includes lift arms and is configured to empty into the first autonomous service vehicle using the lift arms.

10. The method of claim 9, wherein the first receptacle is configured to empty without aid of a vehicle-mounted lift device of the first autonomous service vehicle.

11. The method of claim 8, wherein each of the one or more receptacles is in remote communication with the first autonomous service vehicle in response to arrival of the first autonomous service vehicle.

12. The method of claim 8, wherein the first autonomous service vehicle further comprises:
 a rolling chassis;
 a bed supported by the rolling chassis and configured to receive waste; and
 a controller in communication with the rolling chassis and configured to autonomously operate the first autonomous service vehicle.

13. The method of claim 8, wherein the one or more receptacles are configured to autonomously return to respective receptacle return locations in response to emptying.

14. The method of claim 8, wherein the one or more receptacles each include optical navigation means.

15. A non-transitory computer-readable medium including computer-executable programming instructions for performing a method for autonomous receptacle transportation, the method comprising:
 monitoring location data associated with one or more service vehicles based on first location signals from the one or more service vehicles;
 receiving an arrival signal in response to arrival of a first autonomous service vehicle of the one or more service vehicles at a first service area; and
 transmitting a message causing one or more receptacles to autonomously navigate to the first autonomous service vehicle, each of the one or more receptacles comprising a transporter that forms an integral portion of the corresponding receptacle.

16. The non-transitory computer-readable medium of claim 15, wherein a first receptacle of the one or more receptacles includes lift arms and is configured to empty into the first autonomous service vehicle using the lift arms.

17. The non-transitory computer-readable medium of claim 16, wherein the first receptacle is configured to empty without aid of a vehicle-mounted lift device of the first autonomous service vehicle.

18. The non-transitory computer-readable medium of claim 15, wherein the one or more receptacles are configured to autonomously return to respective receptacle return locations in response to emptying.

19. The non-transitory computer-readable medium of claim 15, wherein the one or more receptacles each include optical navigation means.

20. The non-transitory computer-readable medium of claim 15, wherein the first autonomous service vehicle further comprises:
 a rolling chassis;
 a bed supported by the rolling chassis and configured to receive waste; and
 a controller in communication with the rolling chassis and configured to autonomously operate the first autonomous service vehicle.

* * * * *